United States Patent [19]

Kahn

[11] Patent Number: 4,896,371

[45] Date of Patent: Jan. 23, 1990

[54] SYNCHRONOUS AM TRANSMISSION SYSTEM HAVING REDUCED SELF INTERFERENCE EFFECTS

[76] Inventor: Leonard R. Kahn, 137 E. 36th St., New York, N.Y. 10016

[21] Appl. No.: 123,508

[22] Filed: Nov. 20, 1987

[51] Int. Cl.$^4$ .................... H04B 1/02

[52] U.S. Cl. .................... 455/105; 455/108; 455/103

[58] Field of Search .................... 455/59, 49, 50, 51, 455/101, 102, 103, 105, 108; 381/15, 16

[56] References Cited

U.S. PATENT DOCUMENTS

| | | | |
|---|---|---|---|
| H288 | 6/1987 | Gutleber | 455/105 X |
| 1,994,288 | 3/1935 | Scheibell | 455/50 |
| 4,223,405 | 9/1980 | Hattori et al. | 455/105 |
| 4,232,392 | 11/1980 | French | 455/105 |
| 4,570,265 | 2/1986 | Thro | 455/105 X |

OTHER PUBLICATIONS

"Quasi-Synchronous Operation of A.M. Transmitters"; International Conference on Communications Equipment and Systems, Brighton, Sussex, England; Jun. 8-11, 1976; D. Carter; pp. 90-93.

*Primary Examiner*—Benedick V. Safourek
*Assistant Examiner*—Ralph E. Smith
*Attorney, Agent, or Firm*—E. A. Onders

[57] ABSTRACT

A synchronous transmission system that improves reception in areas where the main and the satellite signal create significant self interference. At least one of the synchronous transmitters is phase modulated in accordance with a selected modulation function which varies at a sub sonic rate.

7 Claims, 1 Drawing Sheet

SYNCHRONOUS AM TRANSMISSION SYSTEM HAVING REDUCED SELF INTERFERENCE EFFECTS

FIELD OF THE INVENTION

This invention relates generally to synchronous amplitude modulation (AM) radio transmission systems, including those used for broadcast purposes.

BACKGROUND OF THE INVENTION

Synchronous, or common frequency, transmission systems are well known and may be broadly defined as those which use a single carrier frequency shared by two or more transmitters that have identical program modulation, where the transmitters are located close enough to provide overlapping service areas.

It has been known, since the early days of AM broadcasting, that synchronous transmission could provide improved coverage, while not appreciably increasing interference. The system is especially attractive where dense "islands" of population are to be served. In such cases, a satellite transmitter, or transmitters, can be located close to the clusters of population in cases where they are not adequately covered by the primary or main transmitters.

The basic weakness of synchronous transmission is that it creates a zone of self interference, where signals from the primary and satellite transmitter overlap and are approximately equal in amplitude, in which carrier nulls can occur, thereby producing distortion in receivers. Such zones are called "mush zones", and it is desirable to locate them in regions of the radio stations's coverage area where there is low population density and where no major roads are located so as to minimize the number of listeners likely to encounter the distortion which results from the self interference. However, mush zones continue to be the greatest deterent to widespread use of synchronous AM transmission.

Accordingly, considerable engineering effort in the prior art has been directed toward reducing the adverse effects of self interference in the mush zones. For example, there are three basic synchronous transmission system arrangements in use.

In one form of prior art system the individual oscillators in the main and satellite transmitters, which establish the carrier frequency, operate independently and their frequencies are compared and adjusted to "zero beat" with some common standard, such as the reference signal produced by WWV. Alternatively, the frequency of the satellite oscillator is compared with that of the carrier frequency of the main transmitter. As long as the frequency difference between the main and satellite carriers is maintained accurately, say to less than one-tenth of a hertz, the mush zone is fairly narrow and well confined.

In another reform of prior art system, the main and satellite transmitter oscillators are locked in frequency and maintained in a close phase relationship. This arrangement avoids variable beating effects due to any frequency difference, but it creates, at least during the daytime under stable propagation conditions, sharp but very deep carrier cancellation nulls at specific locations in the mush zone. Accordingly, listeners that live in or close to such a null suffer poor reception. Furthermore, listeners driving through such nulls will hear significant bursts of noise and distortion. For example, when driving a car at 55 miles per hour directly along a straight line connecting the main and satellite transmitters of a synchronous station operating on a carrier frequency of 1 MHz, a listener's receiver will see a complete cycle of phase difference between the main and satellite signals about every six seconds.

Another prior art approach has been to maintain a precise frequency offset, for example $\pm 0.1$ Hz, between the main and satellite transmitters of a synchronous station so that the location of carrier nulls in the mush zone slowly and continuously move. Since the nulls move, they cause degradation throughout the mush zone, compared with fixed nulls which cause degradation at specific locations in the mush zone. The AVC of a typical radio receiver is able to average out these slowly moving nulls, providing a somewhat noisier signal, but one whose level is relatively constant.

My U.S. Pat. No. 4,569,073 and pending U.S. patent application Ser. No. 07/117,594, filed Nov. 5, 1987 cover assymetrical sideband AM transmission systems one of which (known as POWER-side TM) is presently being used experimentally for reducing the adverse effects of sideband cancellation also which occurs in the mush zone of a synchronous transmission system. The POWER-side system, which is manufactured by Kahn Communications, Inc., Westbury, N.Y., also allows listeners to favor one sideband in tuning, which in laboratory tests indicates that superior reception can be achieved under worst case conditions using this technique.

In light of the above, it is an object of the present invention to provide an improved synchronous AM transmission system wherein the adverse effect of self interference in the mush zone is reduced.

SUMMARY OF THE INVENTION

In accordance with the present invention there is provided an improved synchronous AM transmission system which includes a first and second AM transmitter, each having program and carrier signal inputs and means, for supplying a program signal to the program signal input of each of the transmitters. The apparatus also includes means for supplying a first carrier signal of predetermined frequency to the carrier signal input of a selected one of the transmitters and means, for supplying to the carrier signal input of the other of the transmitters a second carrier signal of substantially the same frequency as that of the first carrier signal and having a relative phase with respect thereto which is varied in accordance with a selected phase modulation function.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
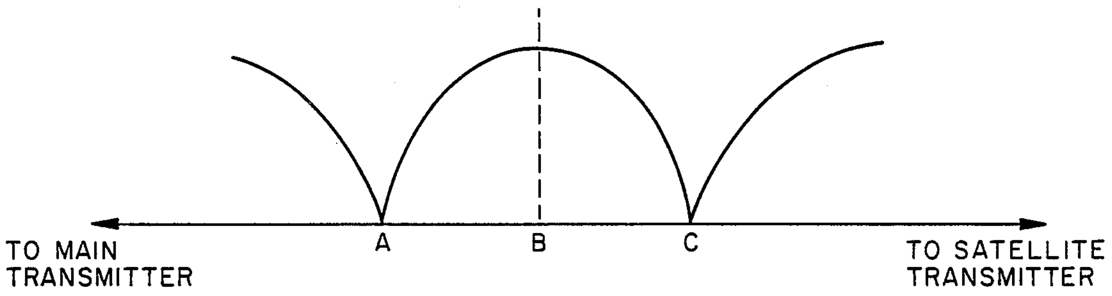
FIG. 1 is a graph illustrating signal strength vs. distance in the mush zone between the main and satellite transmitters of a synchronous AM station.
Figure 2:
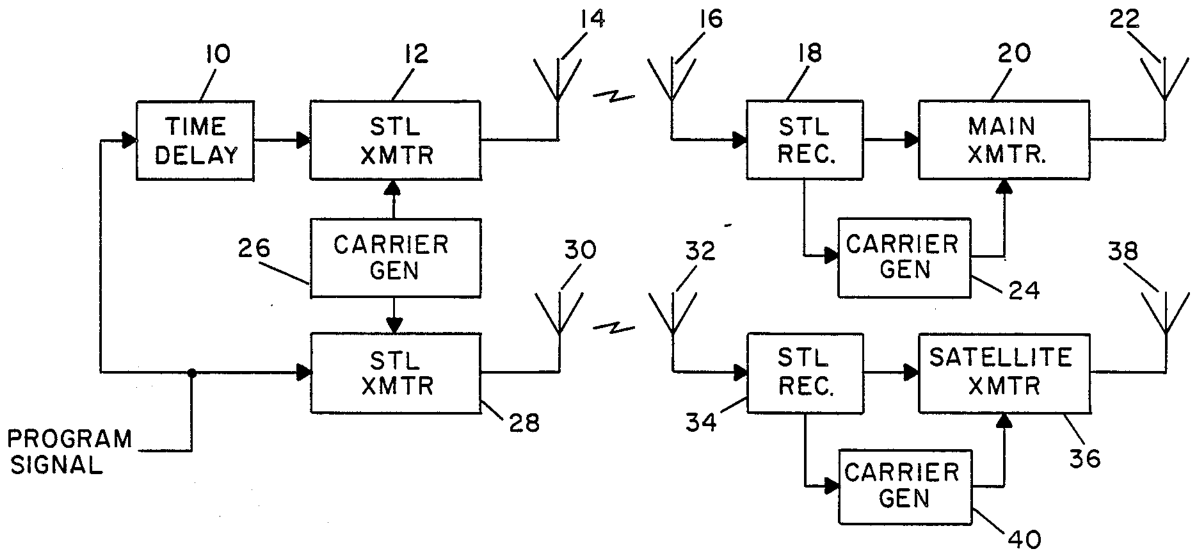
FIG. 2 (PRIOR ART)
FIG. 2 is a block diagram illustrating a prior art two transmitter synchronous AM station arrangement wherein the main and satellite transmitters are phase locked.

FIG. 1 illustrates the signal strength which results from the combination of the separate but overlapping signals radiated from the main and satellite transmitters of a two transmitter synchronous AM station such as that shown in FIG. 2. FIG. 1 is valid for the area between the transmitters where the transmitted signals are approximately of equal levels. Because the overlapping signals create self interference and, in fact, cancel at specific distances from the two transmitters where signal levels are equal in amplitude and opposite in phase (i.e., at points A and C), the resulting combined signal strength is very sensitive to location. The signal strength level actually follows the absolute value of a sine wave (i.e.: rectified sine wave) and exhibits cusps at null points A and C. On the other hand, the slope of the curve in FIG. 1 goes to zero at point B, where the two signals are in phase and, therefore, add.

FIG. 2 shows a prior art synchronous transmission system which is capable of exact frequency and phase-locked operation. In the system of FIG. 2, it is assumed that both the main and satellite transmitters 20 and 36 are located remote from the radio station's studio and that they are fed programming via studio-to-transmitter links (STL), which in this case are radio links.

In FIG. 2, a program signal to be transmitted (either monophonic or a stereo pair) is supplied to the input of STL transmitter 12 via time delay circuit 10 and also directly to STL transmitter 28. Time delay unit 10 may, for example, utilize "bucket brigade" type integrated circuits (ICs) to provide an amount of time delay which can be controlled by an adjustable frequency clock signal. Changing the clock frequency produces a corresponding change in the delay introduced by unit 10 in a manner well known in the art. This time delay is provided because it is assumed that main transmitter 20 is located closer to the studio than satellite transmitter 40 and it is desired to equalize the transit time for audio modulation traveling from the main and satellite transmitters to the mush zone.

STL transmitters 12 and 28 each are coupled to a corresponding one of the STL antennas 14 and 30. Both STL transmitters derive their carrier signals from common carrier generator 26, so that the two STL carriers are either of the same frequency and locked in phase, or bear a fixed relationship in frequency and phase.

At the main transmitter location, the STL signal from STL transmitter 12 is received by STL antenna 16 and STL receiver 18 and the resulting program signal is coupled to the audio input of main transmitter 20, which, in turn, feeds main antenna 22. The carrier frequency for main transmitter 20 is derived from carrier generator 24, which is controlled by another output from STL receiver 18 so that the carrier frequency of the main transmitter 20 bears an exact frequency relationship to the STL carrier frequency.

Main transmitter 20 may be a conventional AM transmitter, or it may incorporate a stereo encoder or a "POWER-side" generator in accordance with the teachings of my U.S. Pat. No. 4,569,073 and my pending U.S. patent application Ser. No. 07/117,594 filed Nov. 5, 1987.

Similarly, the satellite installation receives the STL signal from STL transmitter 28 using STL antenna 32 and STL receiver 34, which feeds the resulting program signal to satellite transmitter 36 and synchronizing information to carrier generator 40.

Because the carriers of STL transmitters 12 and 28 are of the same frequency and are phase-locked or bear a fixed relationship in frequency and phase, the main transmitter signal and the satellite transmitter signal can be synchronized in frequency and made to have a fixed phase relationship, and, when received during daytime conditions, should have coincidence audio modulation.

The system shown in FIG. 2 is just one example of a prior art synchronous AM transmission system.

Figure 3:
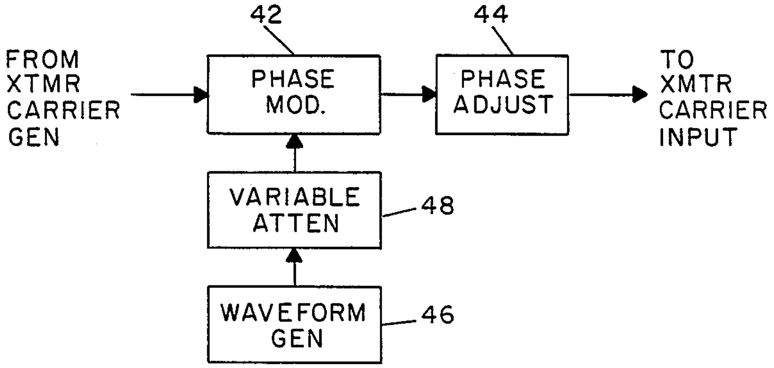
FIG. 3 is a block diagram of a modification of the synchronous AM transmitter arrangement of FIG. 2, embodying the invention in one form.

FIG. 3 shows how either the main or the satellite transmitter in FIG. 2 may be modified so a s to embody the present invention. It is assumed, for purposes of illustration, that the modification shown in FIG. 3 is applied to the main transmitter because generally the main transmitter site is more accessible to station personnel and more convenient for adjustment and maintenance. However, the invention could be implemented at either the main or the satellite transmitter. If two or more satellite transmitters are used in a synchronous system and the mush zone results from the presence of the main signal, the implementation of the invention in the main transmitter is proper. However, if two satellite stations interfere to create a mush zone, the invention should be implemented in one of the interferring satellite transmitters.

As shown in FIG. 3, the carrier signal from main carrier generator 24 in FIG. 2 would instead be coupled to the input of a phase modulator 42. Phase modulator 42 is modulated by a selected waveform from waveform generator 46 which varies at a sub sonic rate. Although a triangular shaped waveform is preferred, other waveforms can be used, such as a saw tooth shaped wave, but they should not have a rich harmonic content which might create undesirable audible effects. Waveforms having portions with fixed amplitudes, such as a square wave, are not preferred because they cause the nulls in the mush zone to remain at a particular location for relatively long periods of time, instead being smeared as described previously. The rate at which the selected waveform varies may be any within the sub-sonic range.

For example, a triangular wave of 0.1 Hz may be generated in block 46. Its amplitude is then suitably adjusted by variable attenuator 48 to produce the desired amount of phase modulation in phase modulator 42.

The output of phase modulator 42 feeds a phase adjuster 44, which may be an adjustable tuned circuit, for example, for may be implemented by simply applying a dc bias to phase modulator 42. It should be noted that phase adjuster is not needed if the phase modulation produced by phase modulator 42 is equal to $+/-180$ degrees or if the main and satellite signals are not in true lock, since in these cases there would be no optimum setting for the adjuster. Under such conditions, phase adjustment 44 may be deleted. The output of block 44 supplies the carrier input for main transmitter 22.

If phase modulation is added to one of the transmitted signals in accordance with FIG. 3 it will have a much more pronounced effect at points A and C in FIG. 1 than at point B. Accordingly, a small amount of phase modulation will provide much more improvement in the signal strength at points A and C than it will cause a reduction in signal strength at point B. For example, if $\pm 60$ degrees of phase modulation is introduced into one transmitted signal, the average signal strength at points A and C will rise from zero to 0.256% of the peak level; i.e., 11.84 db below the peak signal strength of the two combined signals or about 5.8 db below that of one of the signals.

On the other hand, this same amount of phase modulation, i.e., ±60 degrees, will cause only an average reduction to 0.9885 of the peak or less than one-tenth of a db loss at point B. Accordingly, with proper adjustment of the system it is possible to make a significant improvement in reception at null points in the mush zone while maintaining almost all of the advantages of carrier addition in other areas. The location of these reinforced areas can be chosen such that they cover important listening locations, such as entrances to major toll bridges and tunnels where traffic tends to slow or halt.

If, however, the phase modulation is increased to ±180 degrees, then all signal locations are affected equally. This would be the adjustment one might make if there were no preferred listening locations in the mush zone or if the oscillators of the main and satellite transmitters where not phase locked and the nulls constantly moved.

Another important advantage of using less than 180° phase modulation is that it allows one to avoid deep null noise when listening at points where the signal is close to the maximum reinforced signal strength.

The present invention causes the location of the cusps or nulls to "smear" by oscillating about points A and C in FIG. 1 and, therefore provides signals having reasonable average levels at points A and C. At the same time the peak signal locations (point B in FIG. 1), while being reduced in amplitude slightly, will retain an acceptable signal strength. Synchronous transmission systems in accordance with the present invention are capable of compromise operation that retains almost the full strength at strong signal locations (such at point B in FIG. 1), while providing a very usable signal at locations which would otherwise be at a deep null (such as points A and C in FIG. 1).

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. An improved synchronous AM transmission system, comprising:

first and second AM transmitters, each having program and carrier signal inputs;

means for supplying a program signal to the program signal input of each of said transmitters;

first means for supplying a first carrier signal of predetermined frequency to the carrier signal input of a selected one of said transmitters; and second means for supplying to the carrier signal input of the other of said transmitters a second carrier signal of substantially the same frequency as that of said first carrier signal and having a relative phase with respect thereto which is varied in accordance with a selected phase modulation function.

2. A system in accordance with claim 1 wherein said modulation function is such as to vary the phase of said second carrier signal about a quiescent value by less than ±180°.

3. A system in accordance with claim 2 wherein said modulation function is such as to vary the phase of said second carrier signal by less than ±90°.

4. A system in accordance with claim 2 or 3 wherein said modulation function is a triangular waveform.

5. A system in accordance with claim 2 or 3 wherein said quiescent value is adjustable.

6. A system in accordance with claim 2 or 3 wherein said modulation function varies the phase of said second carrier signal at a predetermined sub sonic rate.

7. An improved synchronous AM transmission system having at least two system transmitters whose transmitted signals interfere to create one or more nulls in a mush zone, comprising:

first and second system AM transmitters, each having program and carrier signal inputs;

means for supplying a program signal to the program signal input of said first transmitter means for supplying a program signal to the program signal input of said second transmitter;

first means for supplying a first carrier signal of predetermined frequency to the carrier signal input of a selected one of said transmitters; and second means for supplying to the carrier signal input of the other said transmitters a second carrier signal of substantially the same frequency as that of said first carrier signal and having a relative phase with respect thereto which varies about a quiescent value by less than ±90, where said variation is at a sub sonic rate in accordance with a triangular waveform phase modulation function, thereby causing the location of said null to vary.

* * * * *